(12) United States Patent
Howes et al.

(10) Patent No.: US 8,510,379 B2
(45) Date of Patent: Aug. 13, 2013

(54) DISPLAY OF CONTENT INTERACTION DATA IN A BROWSER

(75) Inventors: Timothy Howes, Los Altos, CA (US); Eric Vishria, San Carlos, CA (US)

(73) Assignee: RockMelt, Inc., Mountain View, CA (US)

( * ) Notice: Subject to any disclaimer, the term of this patent is extended or adjusted under 35 U.S.C. 154(b) by 121 days.

(21) Appl. No.: 13/033,579

(22) Filed: Feb. 23, 2011

(65) Prior Publication Data

US 2012/0215846 A1 Aug. 23, 2012

(51) Int. Cl.
*G06F 11/34* (2006.01)
*G06F 3/048* (2013.01)

(52) U.S. Cl.
USPC ............ 709/204; 715/745; 715/744; 709/224

(58) Field of Classification Search
USPC . 709/204–206, 224, 217–219; 715/751–759, 715/744–747, 764
See application file for complete search history.

(56) References Cited

U.S. PATENT DOCUMENTS

| | | | |
|---|---|---|---|
| 7,539,632 B1 * | 5/2009 | Chakrabarti et al. | 705/26.1 |
| 8,250,145 B2 * | 8/2012 | Zuckerberg et al. | 709/204 |
| 2009/0031244 A1 | 1/2009 | Brezina et al. | |
| 2009/0164400 A1 | 6/2009 | Amer-Yahia et al. | |
| 2009/0187936 A1 | 7/2009 | Parekh et al. | |
| 2010/0318544 A1 | 12/2010 | Nicolov | |
| 2011/0041082 A1 | 2/2011 | Nguyen | |
| 2011/0106796 A1 * | 5/2011 | Svaic | 707/728 |
| 2011/0264736 A1 * | 10/2011 | Zuckerberg et al. | 709/204 |
| 2012/0089681 A1 * | 4/2012 | Chowdhury et al. | 709/206 |
| 2012/0239745 A1 * | 9/2012 | Zuckerberg et al. | 709/204 |

OTHER PUBLICATIONS

PCT International Search Report and Written Opinion, PCT Application No. PCT/US2012/020368, Apr. 24, 2012, 17 pages.
U.S. Appl. No. 12/957,239, filed Nov. 30, 2010.

* cited by examiner

*Primary Examiner* — Kenneth R Coulter
(74) *Attorney, Agent, or Firm* — Fenwick & West LLP

(57) ABSTRACT

A browser obtains content items from a content server, where the content items may include web pages, any individual content within a web page, items fetched via a web services-based API of the content server, and/or items in a feed. Additionally, an interaction module of the browser obtains information about interactions with the content items by those with some relationship to a user of the browser, such as the user's friends on a social networking site. Based on the obtained information, the browser provides an illustration of the information in visual association with the content item. For example, the browser may directly highlight or otherwise visually emphasize the content item itself, or it may provide an indicator for the browser or web page as a whole, or it may display some or all of the information.

20 Claims, 6 Drawing Sheets

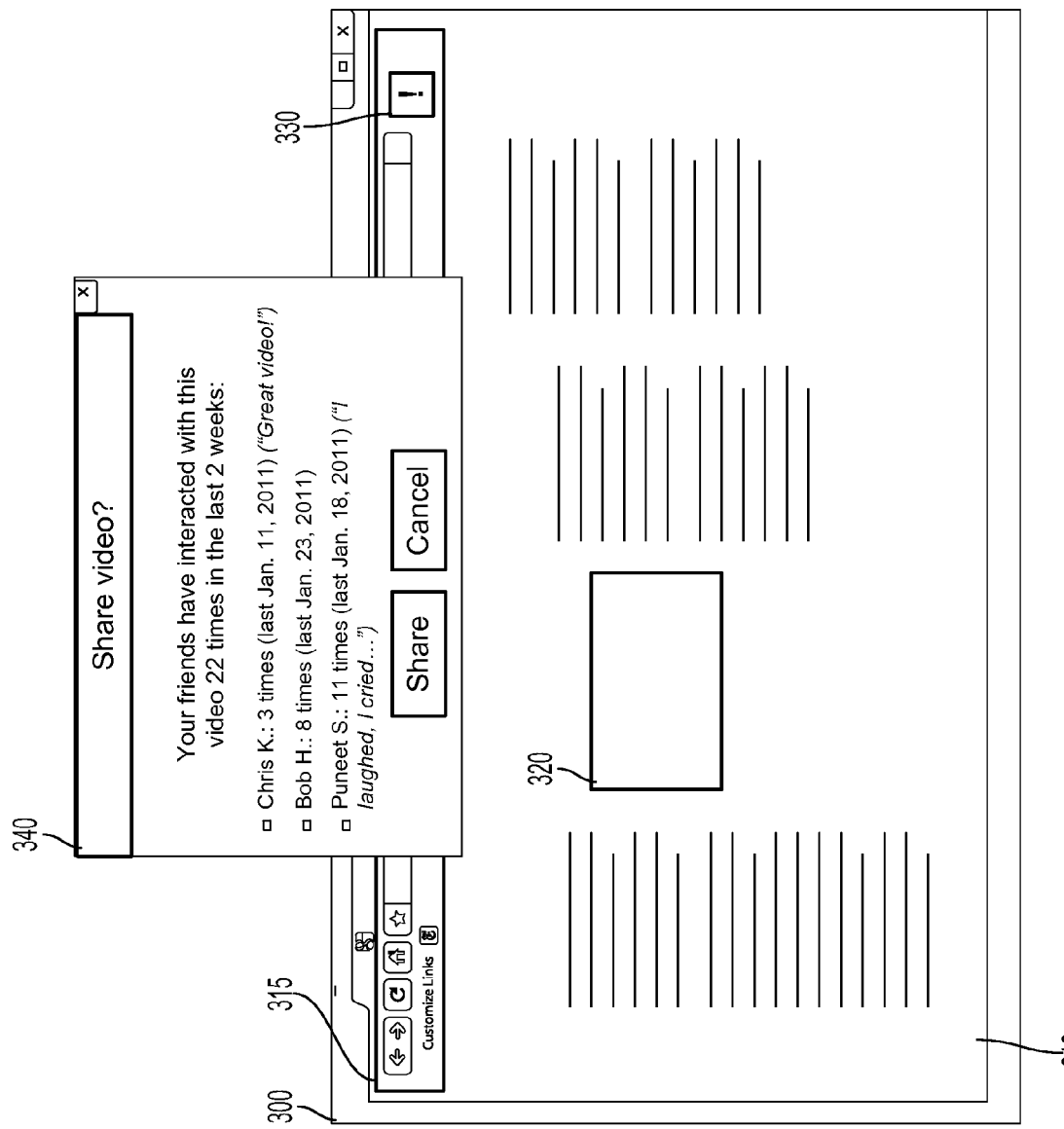

DISPLAY OF CONTENT INTERACTION DATA IN A BROWSER

CROSS REFERENCE TO RELATED APPLICATIONS

This application is related to application Ser. No. 12/957,239, filed on Nov. 30, 2010 and entitled "User Specific Sharing Feature," which application is incorporated herein by reference.

BACKGROUND

The disclosure generally relates to a web browser, and more specifically to displaying data on prior interactions of others with content items currently displayed within the browser.

When viewing content items—such as web pages or feed data, or the individual units of content within them (e.g., multimedia objects such as videos and images included within web pages, or individual feed items such as web pages or messages), or the individual units of content obtained from a service (e.g., a social networking or message posting service) via the service's API—a user may wish to know how other users of interest had previously interacted with that content. For example, a user might be more willing to examine content if it had already been viewed by several of the user's friends from a social networking service, or by people from the user's instant messaging or email contacts lists. Similarly, a user might refrain from sharing an item of content with the user's friends if those friends, or other friends, had already shared the item.

However, conventional browsers fail to provide data regarding prior interactions of the user's friends with content current displayed in the browser. Thus, unless a particular web site, such as a social networking site, has happened to explicitly include information about user interactions with a prior piece of content within the web page data that it provides to a web browser, users of the web browser have no knowledge of whether, or to what degree, their friends have already interacted with the content. Even if a particular web site does explicitly include such information, the information is limited to interactions with content of friends on that particular site, using that particular site, and does not include interactions of those friends, or other friends, with the content via another web site or service.

SUMMARY

To provide social context to a user's web browsing experience, embodiments of a web browser display information about a user's friends' online interactions with respect to web pages and/or content contained therein. In one embodiment, a browser obtains content items, such as a web page and/or any individual content items contained within a web page (e.g. videos or images), from a content server. Additionally, an interaction module of the browser obtains information about interactions with the content items by those having a relationship with a user of the browser, such as the user's friends on a social networking site. Based on the obtained information, the browser provides an illustration of the information in visual association with the content item. For example, the browser may directly highlight or otherwise visually emphasize the content item itself, such as by drawing a colored highlight around an image content item on a web page. Alternatively, the browser may provide an indicator for the browser or web page as a whole, such as an icon that lights up when the page as a whole, or a content item included therein, has had sufficient interactions with others with whom the user has some relationship. Additionally, the browser may display some or all of the information, such as showing a subset of the information in a popup sharing window in response to a user request to share the content. Additionally, the browser may display a set of content items based in part on the interactions. For example, the content items in a feed might be sorted or filtered based on the interactions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIGS. 3A-3C are screenshots of example user interfaces in a window of the browser of FIG. 1, according to one embodiment.

DETAILED DESCRIPTION

The computing environment described herein enables a user to view data on prior interactions of other users who have some relationship with the user—hereinafter more simply referred to as the user's "connections"—with content items currently displayed within the browser. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
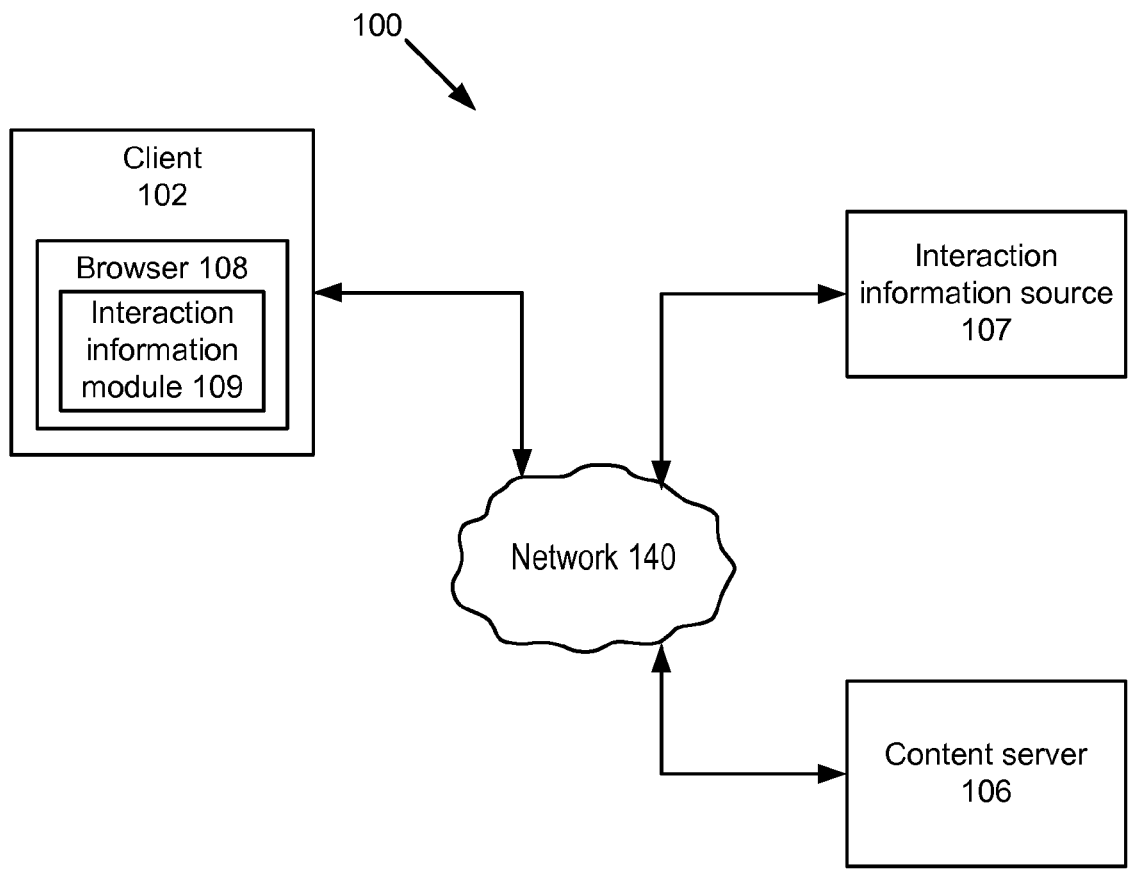
FIG. 1 is a block diagram illustrating a computing environment in which the display of content interaction takes place, according to one embodiment.

Referring to FIG. 1, the computing environment 100 for viewing content interaction data comprises a client 102 with corresponding browser 108, a content server 106, an interaction information source 107, and a network 140. As described in more detail below, the browser 108 on the client 102 obtains content items from one or more content servers 106. The browser 108 additionally obtains information about interactions of others with the obtained content items, and based on the obtained information may display a visual indication in association with the content items, such as the visual indications described with respect to FIG. 3, below. The obtained information may be, for example, statistics on number and type of interactions with a content item (e.g., total number of times that all friends or a particular group of friends in the aggregate, or a single friend in particular, commented on a content item, viewed the content item, liked or disliked the content item, or a total amount of time spent viewing the content item), a description of a particular interaction with the content item (e.g., the string "John Smith commented 'This is a great article!'"), and the like.

The client 102 is a computing device with a processor and a memory capable of running applications like the browser 108. Examples of the client 102 include a desktop, a laptop and a handheld computing device.

The browser 108 is an application for retrieving, presenting, and traversing content available on various entities like the content server 106. The browser 108 can display different types of content, such as web pages, or feeds (e.g., lists of postings or other items related to friends on a social networking service such as FACEBOOK, or messages from a messaging-posting service such as TWITTER, any of which may have embedded URLs). The web browser 108 may obtain the content from the content server 106 in different ways, such as making HTTP requests to a web server, making calls to an API of the content server 106 for individual items of content (e.g., a call to a social networking service API for postings of a user's friends), receiving updated items from a subscribed-to feed, and the like. Additionally, unlike conventional web browsers, the browser 108 may store data on the user's browsing activity and transmit the data to a browser interaction information server for aggregation and storage. The browsing activity data includes data on user interactions with content items displayed within the browser, such as an identifier of the content item interacted with (e.g., a URL corresponding to the content item), the type of the interaction (e.g., viewing, sharing, or printing of the content items), an identifier of the user who interacted with the content items, and a time at which when the interaction took place. The content items for which interaction data is tracked can include web pages as a whole, distinct items displayed within a web page (such as multimedia objects like videos, images, or audio, text regions), items included in a feed (e.g., postings fetched via an API of a social networking service), and the like. The browser 108 may also include functionality for sharing content with users, which may include transmitting content from the user's client 102 to an application server. Sharing functionality is discussed in further detail in U.S. application Ser. No. 12/957,239, filed on Nov. 30, 2010, which is incorporated by reference in its entirety.

Further unlike conventional browsers, the browser 108 comprises an interaction information module 109 that handles obtaining interaction information associated with a particular content item displayed within the browser 108 and displaying visual indications based on the obtained information. The interaction information module 109 is described below in greater detail with respect to FIG. 2.

The content server 106 is a computing device with a processor and a memory, such as a conventional web server, that stores or generates online content such as web pages, feed content, audio or video streams, and the like. The content server 106 transmits the stored online content over network 140 upon receiving a request for the content.

The interaction information source 107 is a computing device with a processor and a memory that stores information about interactions of users with content items. The interaction information source 107 may host a messaging system such as a social networking system (e.g., FACEBOOK), a message-posting system (e.g., TWITTER), an instant messaging system, a user-generated content system, a link-shortening system (e.g. BIT.LY), a sharing service (e.g., DIGG, TUMBLR, REDDIT, or BUZZ), or any other system that enables two or more users to communicate with each other, and may be implemented as a part of the content server 106. In various embodiments, the interaction information source 107 may support sharing functions for the messaging service that enable a user to share content on the messaging service. For example, the content server 106 supports functions that enable a user to share a URL for a web page, or audio, video or textual content on a page. The interaction information source 107 observes the interactions with content performed by users using functionality of the interaction information source 107 and stores information on those interactions. For example, if the interaction information source 107 hosts a social networking system, the information source may store statistics on the fact that various users post a content item, post a comment on a content item, designate approval of the content item (e.g., "like" it), include a copy of a content item in a message to another user, and so forth. The interaction information source 107 may additionally aggregate statistics provided to it by some other source of statistics. The interaction information source 107 makes the stored interaction information available to other systems, e.g., via a web services-based API.

In one embodiment, the statistics sources 107 include a browser statistics server maintained by the same entity that creates and/or maintains the browser 108 and that is specifically configured to aggregate content interaction information tracked by the browsers 108. As noted above, in one embodiment the browser 108 tracks interactions of the user of the browser with the content items displayed within the browser. The interactions tracked by the browser include, but are not limited to, viewing of a current web page, or video, image, or other content item within the web page; sharing of any content item, e.g., using the sharing functionality described in U.S. application Ser. No. 12/957,239; printing of any content item; and playing of a video. The browser 108 communicates this tracked interaction information to the browser statistics server, which then acts as an interaction information source 107, storing the information and making it available to other systems.

Although for the sake of simplicity only one instance of the client 102, content server 106, and interaction information source 107 are depicted in FIG. 1, it is appreciated that there could be any number of each.

Figure 2:
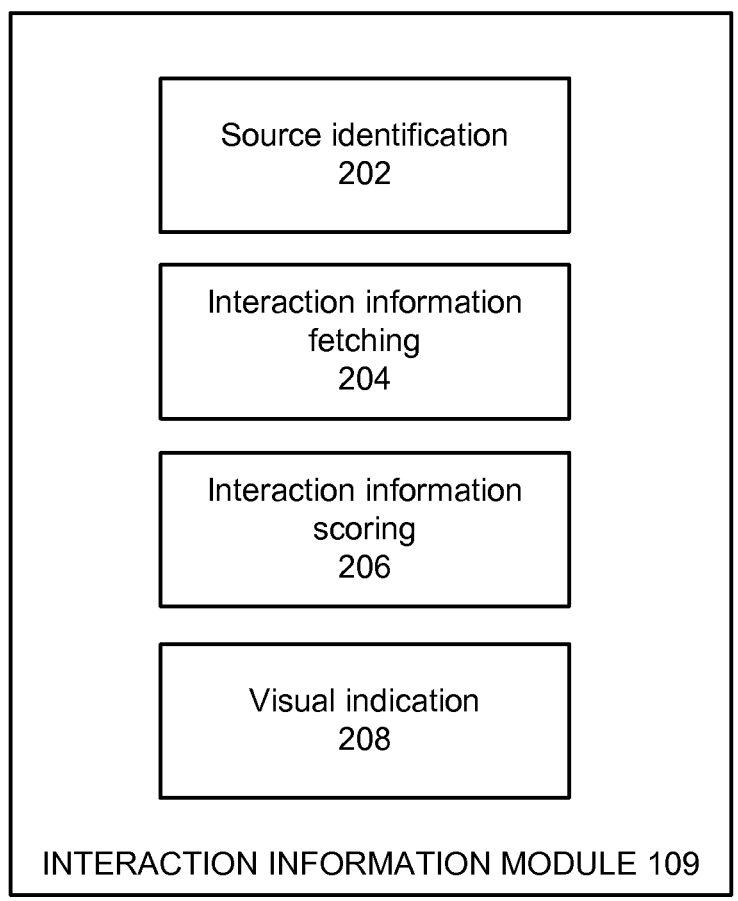
FIG. 2 is a block diagram of an interaction module of a browser of FIG. 1, according to one embodiment.

FIG. 2 is a block diagram of the interaction information module 109 of the browser 108 of FIG. 1, according to one embodiment. The interaction information module 109 obtains interaction information associated with a particular content item displayed within the browser 108 and displays visual indications based on the obtained information.

The source identification module 202 identifies a set of information sources 107 associated with the user, and from which content interaction information may be obtainable. As described above, these sources may include social networking services, message-posting services, URL-shortening services, and sharing services, as well as a browser interaction information server (if any). In one embodiment, the source identification module 202 identifies the sources implicitly, such as by monitoring browsing activity of the user, tracking the sites that the user visits, and comparing those sites to a list of known information sources 107 that track content interaction information. In another embodiment, the source identification module 202 identifies the sources explicitly, by prompting the user to designate a list of sources that the user frequents.

In one embodiment, the source identification module 202 additionally identifies particular connections that use the various information sources 107. For example, the source identification module 202 might identify, as connections of the user, all friends of the user on a social networking site interaction information source 107, either by implicitly observing the interactions of the user performed via the browser 108, or explicitly by querying the social networking site for the user's friends. The identified connections may then be used when later querying information sources 107 for information associated with a particular content item.

The interaction information fetching module 204 obtains information associated with content items currently displayed within the browser 108. Specifically, the interaction information fetching module 204 identifies the content items currently displayed by the browser 108, such as a web page as a whole, content items embedded within a web page, such as a video or an image, items in a feed, such as postings from a social networking service or URLs referenced therein, or documents such as PDFs, word processing files, presentation files, and the like. In one embodiment, any content item with an associated unique identifier, such as a URL, can potentially have information obtained for it by the interaction information fetching module 204.

The interaction information fetching module 204 then obtains interaction information for one or more of the identified content items. Specifically, for each of the information sources 107 identified by the source identification module 202, the interaction information fetching module 204 queries the source for any content interaction information on the content item(s). For example, the interaction information fetching module 204 might query each of the social networking sources for interaction information associated both with the content item(s) and with the user's friends on the social networking system. Similarly, when querying a browser statistics server as described above, the interaction information fetching module 204 might query the server for interaction information associated both with the content item(s) and with people who are the user's friends on any social networking system, email system, instant messaging system, sharing service, or the like. The identity of the content item may be uniquely specified by, for example, a URL or URI associated with the content item.

The optional interaction information scoring module 206 computes a score based on the information obtained by the interaction information fetching module 204 for a given content item, the score quantifying a degree of interaction of the user's connections with the content item. When computing the score, the interaction information scoring module 206 may take into account different factors in different embodiments, such as a number of distinct connections that interacted with the content item, the type of interaction (e.g. viewing, "liking", or commenting on), the number of interactions, the amount of time that has elapsed since the last interaction, and the like. Multiple different factors may also be considered when computing an aggregate score.

The visual indication module 208 displays a visual indication based on the received information and/or on the score computed by the interaction information scoring module 206, if any. In one embodiment, the visual indication module 208 first determines whether the received information meets some minimum threshold. For example, if there is an information score, then the visual indication module 208 compares the score to some minimum score; if there is no score, then the visual indication module may determine whether some minimum number of types of interactions has taken place with respect to the content item. Different types of criteria for determining whether the minimum number of types of interactions has taken place may be employed in different embodiments. For example, different types of criteria include: a number of interactions with the content item; a number of connections that have interacted with the content item; distances of the connections from the user in a connection graph of a social networking service (e.g., a distance of 1 for direct connections of the user, and a distance of 2 for connections that are directly connected with the connections of distance 1, but not directly with the user); and types of interactions (e.g., printing, forwarding, viewing, commenting on, etc.). If the minimum threshold is met, then the visual indication module 208 displays a visual indication in association with the displayed content item. Alternatively and/or additionally, the visual indication module 208 may display different degrees of a particular visual indication based on the value of the score, such as displaying stronger or weaker highlights around a content item based on the score value.

Figure 3A:
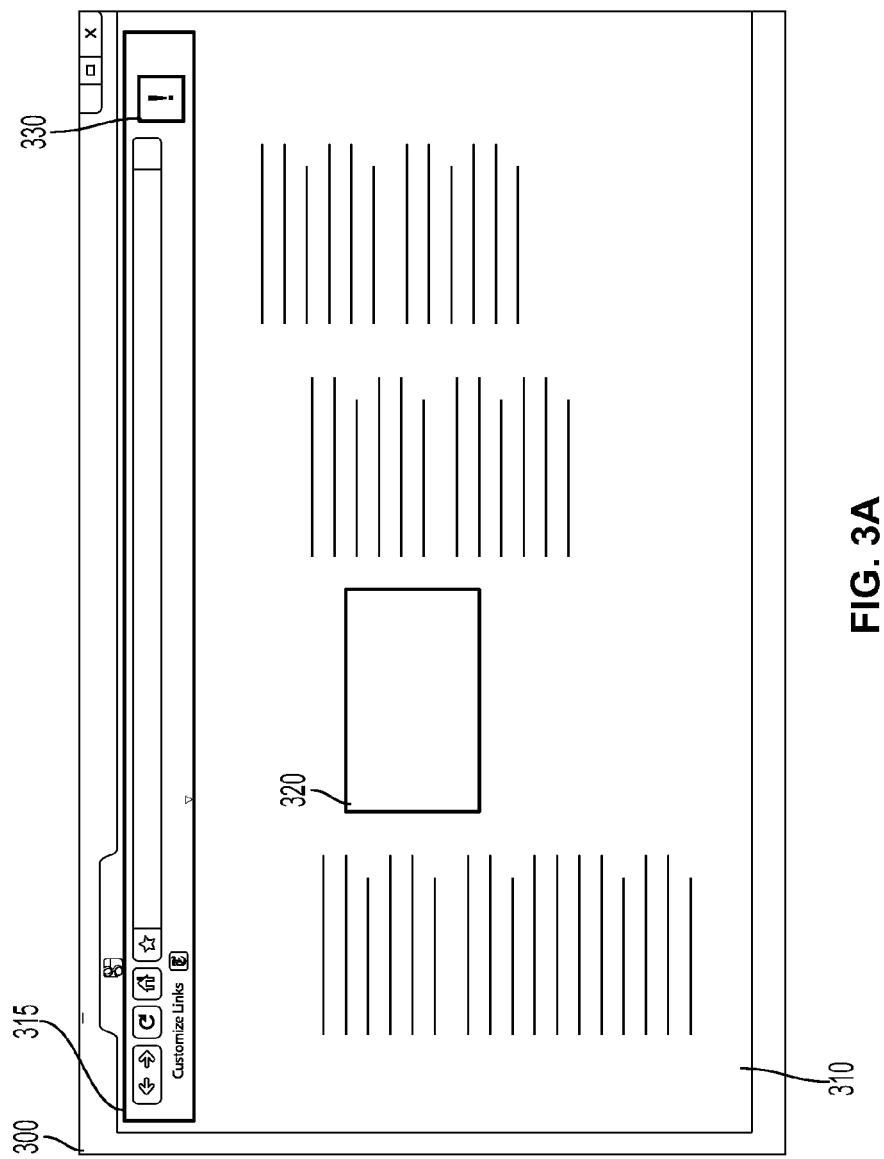
Figure 3B:
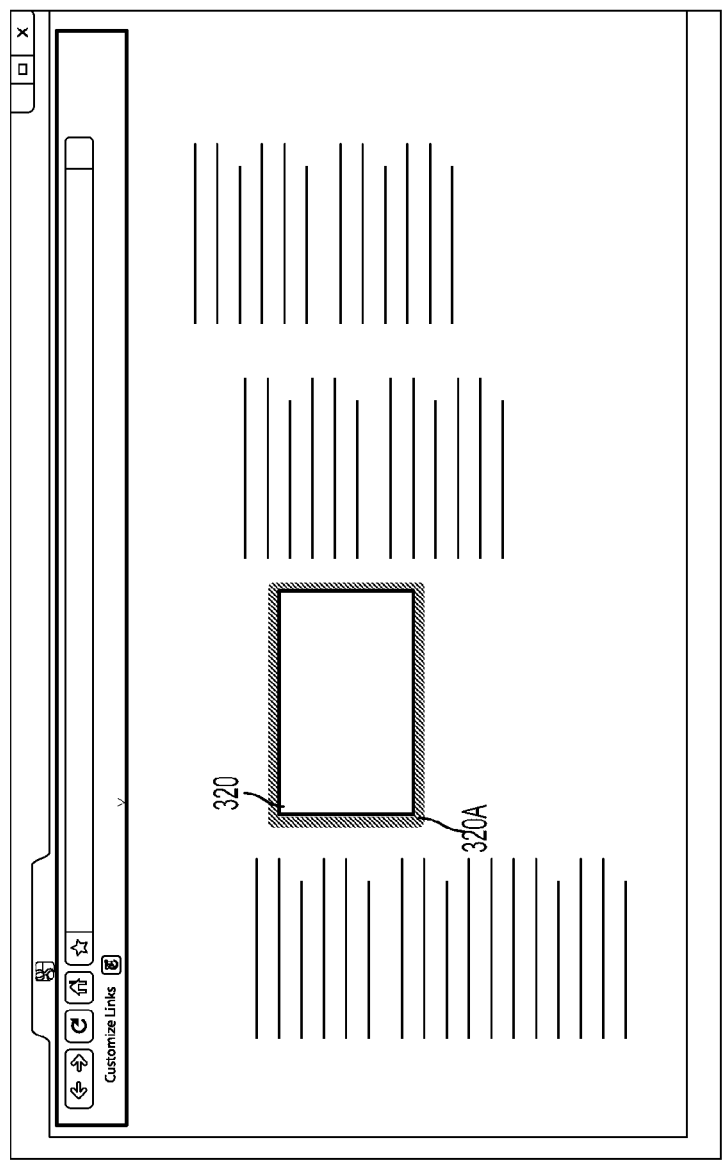

The visual indication module 208 may display different types of visual indications, as illustrated in FIGS. 3A-3C. For example, FIG. 3A illustrates a user interface 300 of the browser 108, including a toolbar region 315, and a content area 310 that includes a multimedia item 320 (e.g., a video or image). The user interface 300 further includes and a visual indication 330 comprising an icon. The icon 330 is in a visually highlighted state (e.g., displaying an exclamation point), indicating that the page, or some content item displayed as part of the page, has been interacted with by the user's connections. The visual indication 330 may then be located outside the main content area of the browser in which web page content is displayed, such as being located in the browser toolbar region 315, although the precise location may vary in different embodiments. The visual indication module 208 may display the icon 330 in a non-visually highlighted state (e.g., invisible or empty) when the page, and/or content items displayed in the page, has not been interacted with by the user's connections.

Alternatively and/or additionally, the individual content items within a page may be visually emphasized within the browser content area, such as by adding highlighting to the content item, drawing a brightly-colored rectangle 320A around the content item 320 as depicted in FIG. 3B, and the like.

As another example of a visual indication, the information itself, or some subset thereof, may be displayed. For example, in one embodiment when the user designates a content item 320 for sharing, a sharing user interface of the browser 108 appears, such as a popup window 340 depicted in FIG. 3C. In addition to displaying sharing options, such as options for selecting users with whom to share the content item (not depicted in FIG. 3C), the user interface may additionally display a subset or summary of statistics created by the visual indication module 208. The summary of the statistics might include a total number of interactions with the content item by the user's connections over some past time period. For example, the popup window 340 displays a summary of interactions with the content item 320 by three of the user's connections (e.g., stating that friends have interacted with the content item 22 times in the last 2 weeks). In one embodiment, the visual indication module 208 modifies the sharing options made available to the user based on the interaction statistics, such as sorting the list of connection options with whom to share based on the extent to which they have already shared or interacted with the content. As another example of a visual indication, one or more of the interactions themselves, or portions thereof, may be depicted based on the information obtained by the interaction information fetching module 204. For example, the popup window 340 further displays a summary of interactions with the content item 320 by three of the user's connections (Chris K., Bob H., and Puneet S.), along with a date and time of the last interaction and a most recent comment on the content item, if any. It is appreciated that the above-described visual indications are merely for purposes of example, and that many different forms of visual indication are possible.

In one embodiment, the visual indication module 208 alters the ordering of, and/or filters, individual content items based on the received information and/or on the score computed by the interaction information scoring module 206, if any. For example, the content items in a feed, or in a list of content items received via a call to an API of the content server 106, could be sorted according to the score, or items with scores below some threshold could be filtered.

Figure 4:
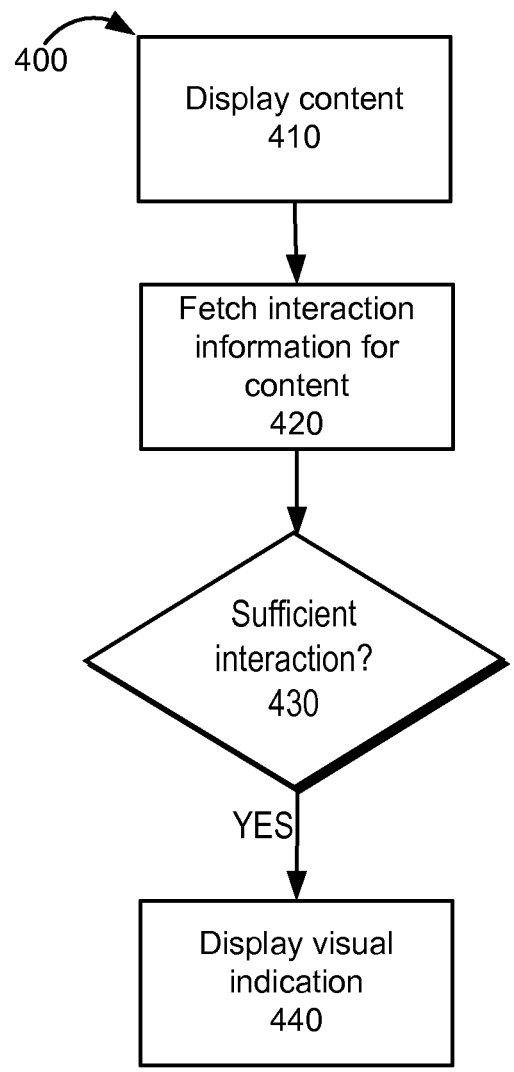
FIG. 4 is a flowchart of a process performed by the browser of FIG. 1 and its interaction module, according to one embodiment.

FIG. 4 is a flowchart of a process 400 performed by the browser 108 of FIG. 1 and its interaction module 109, according to one embodiment. Initially, the browser 108 obtains a content item, such as a particular web page and any other content items within it, such as videos or images. The browser then displays 410 the obtained content item. The information fetching sub-module 204 of the interaction module 109 obtains 420 content interaction information for the content item from one or more information sources 107, which may include a browser interaction information server as described above. The visual indication sub-module 208 of the interaction module 109 determines 430, based on the obtained content interaction information, whether there has been at least some threshold degree of interaction with the content item by the user's connections. Different embodiments may employ different metrics for determining whether the threshold degree of interaction has been met. For example, in one embodiment the metric the threshold degree of interaction in one embodiment might be a single printing, viewing, commenting on, or forwarding of a content item. In another embodiment, the metric might be whether there has been some given number of "likes" of the content item by some subset of the user's friends. If the threshold degree of interaction has been met, then the visual indication sub-module 208 displays 440 some visual indication of the information in association with the content item, such as an icon corresponding to a web page as a whole, a visual highlight for a content item that is part of the web page, a subset of the information in human-readable form within a dialog box, or the like.

The visual indications provide the user with additional knowledge that the user can use when deciding how to interact with the content item(s). For example, if the visual indications indicate that a given content item has been viewed or otherwise interacted with by the user's connections, the user may decide to examine the content item further. Conversely, if the visual indication indicates that a large number of the user's connections have already viewed, or have shared, a content item, the user may decide to refrain from sharing the content item with those friends.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for providing interaction statistics for content items displayed in a browser used by a user, comprising:
   receiving, by the browser, a web page including a reference to a content item to be displayed within the web page;
   receiving, by the browser, the content item from a content server;
   displaying, by the browser, the web page, and a representation of the content item within the web page at a content item layout position;
   identifying, by the browser, a social networking service on which the user has an account;
   identifying, by the browser, connections of the user that have accounts on the social networking service;
   obtaining, by the browser from the social networking service, information about interactions of the connections with the content item; and
   responsive to the obtained information indicating at least a threshold level of interaction of the connections with the content item, adding, by the browser in addition to the representation of the content item, visual emphasis to the content item without changing the content item layout position.

2. The method of claim 1, wherein the content item is received via a web services API of the content server.

3. The method of claim 1, wherein the content item is a multimedia object.

4. The method of claim 1, wherein the interactions of the connections with the content item comprise at least one of: posting a message including the content item on the social networking service, designating approval of the content item on the social networking service, and posting a comment about the content item on the social networking service.

5. The method of claim 1, further comprising:
tracking data on user interactions with content items displayed within the browser;
transmitting the data to a remote browser information server for storage; and
obtaining information about interactions of the connections with the content item by requesting information about user interactions with content items from the browser information server.

6. The method of claim 1, further comprising:
displaying an icon within a toolbar of the browser responsive to displaying the visual emphasis associated with the content item, the icon being in a visually highlighted state.

7. The method of claim 1, wherein displaying the visual emphasis comprises displaying a subset of the obtained information, the subset comprising at least one of: identifiers of connections that have interacted with the content item, a number of interactions with the content item, and a time of interaction with the content item.

8. The method of claim 1, wherein the threshold level is one interaction of one of the connections with the content item.

9. The method of claim 1, further comprising:
determining a number of distinct connections that interacted with the content item, wherein a level of interaction of the connections with the content item is evaluated based at least in part on the determined number of distinct connections.

10. The method of claim 1, wherein a level of interaction of the connections with the content item is evaluated based at least in part on distances of the connections from the user in a connection graph of the social networking service.

11. The method of claim 1, wherein a level of interaction of the connections with the content item is evaluated based at least in part on a total number of interactions of connections with the content item.

12. The method of claim 1, further comprising:
computing an interaction score based on the obtained information about interactions; and
displaying one of a plurality of possible degrees of the visual emphasis based on the computed interaction score.

13. A non-transitory computer-readable storage medium having executable computer program instructions embodied therein for providing interaction information for content items displayed in a browser used by a user, actions of the computer program instructions comprising:
receiving a web page including a reference to a content item to be displayed within the web page;
receiving the content item from a content server;
displaying the web page, and a representation of the content item within the web page at a content item layout position;
identifying a social networking service on which the user has an account;
identifying, by the browser, connections of the user that have accounts on the social networking service;
obtaining information about interactions of the connections with the content item from the social networking service;
responsive to the obtained information indicating at least some threshold level of interactions of the connections with the content item, adding visual emphasis to the content item without changing the content item layout position.

14. The non-transitory computer-readable storage medium of claim 13, further comprising:
identifying an interaction information source other than a social networking service; and
adding, to the obtained information, information from the interaction information source about interactions of connections of the user with the content item.

15. The non-transitory computer-readable storage medium of claim 14, wherein the interaction information source is one of a message-posting service and a link-shortening service.

16. The non-transitory computer-readable storage medium of claim 13, the actions of the computer program instructions further comprising:
tracking data on user interactions with content items displayed within the browser;
transmitting the data to a remote browser information server for storage; and
obtaining information about interactions of the connections with the content item by requesting information about user interactions with content items from the browser information server.

17. The non-transitory computer-readable storage medium of claim 13, wherein the interactions of the connections with the content item comprise at least one of: posting a message including the content item on the social networking service, designating approval of the content item on the social networking service, and posting a comment about the content item on the social networking service.

18. The non-transitory computer-readable storage medium of claim 13, the actions further comprising displaying an icon within a toolbar of the browser responsive to displaying the visual emphasis associated with the content item, the icon being in a visually highlighted state.

19. The non-transitory computer-readable storage medium of claim 13, wherein displaying the visual emphasis comprises displaying a subset of the obtained information, the subset comprising at least one of: identifiers of connections that have interacted with the content item, a number of interactions with the content item, and a time of interaction with the content item.

20. A computer-implemented method for providing interaction statistics for content items displayed in a browser used by a user, comprising:
receiving, by the browser, a web page including a reference to a content item to be displayed within the web page;
receiving, by the browser, the content item from a content server;
displaying, by the browser, the web page and a representation of the content item of the web page within a content area of the browser at a content item layout position;
identifying, by the browser, a social networking service on which the user has an account;
identifying, by the browser, connections of the user that have accounts on the social networking service;
obtaining, by the browser from the social networking service, information about interactions of the connections with the content item, the interactions comprising at least one of: posting a message including the content item on the social networking service, designating approval of the content item on the social networking service, and posting a comment about the content item on the social networking service; and
responsive to the obtained information indicating at least some threshold degree of interactions of the connections with the content item, adding, by the browser in addition to the representation of the content item, visual emphasis to the displayed representation of the content item without changing the content item layout position.

* * * * *